United States Patent [19]

Funato et al.

[11] Patent Number: 4,712,852
[45] Date of Patent: Dec. 15, 1987

[54] HOLOGRAM DISK FOR DEFLECTING A LIGHT BEAM

[75] Inventors: Hiroyoshi Funato; Nobuo Banba, both of Kanagawa, Japan

[73] Assignee: Ricoh Company, Ltd., Tokyo, Japan

[21] Appl. No.: 870,079

[22] Filed: Jun. 3, 1986

[30] Foreign Application Priority Data

Jun. 7, 1985 [JP] Japan ............... 60-123937

[51] Int. Cl.⁴ .................. G02B 26/10; G03H 1/04
[52] U.S. Cl. ........................................ 350/371
[58] Field of Search ............................ 350/3.71

[56] References Cited

U.S. PATENT DOCUMENTS 4,487,472 12/1974 Asano ................ 350/3.71

FOREIGN PATENT DOCUMENTS 0224326 12/1983 Japan ................ 350/3.71

*Primary Examiner*—Bruce Y. Arnold
*Attorney, Agent, or Firm*—Oblon, Fisher, Spivak, McClelland, & Maier

[57] ABSTRACT

A hologram disk for deflecting a light beam in a hologram scanner includes a plurality of straight-line gratings formed by holograms in an annular pattern for deflecting the light beam. The line-to-line distance $d\theta$ between adjacent lines of each of said straight-line gratings is determined to meet, at least approximately, the following equation when said each straight-line grating is rotated through an angle $\theta R$:

$$d\theta = \frac{\lambda \sin\theta R}{\sin(\alpha \cdot \theta R)}$$

where $\lambda$ is the wavelength of the light beam and $\alpha$ is a proportionality constant. Therefore, the angle $\theta s$ through which the light beam is deflected is expressed by $\theta s = \alpha \cdot \theta R$.

1 Claim, 6 Drawing Figures

HOLOGRAM DISK FOR DEFLECTING A LIGHT BEAM

BACKGROUND OF THE INVENTION

The present invention relates to a hologram disk for deflecting a light beam.

Hologram scanners are known for use in optical scanning mechanisms such as in optical printers or the like. The hologram scanner includes a hologram disk rotatable about its own axis by a motor.

The hologram disk comprises a circular plate on which a plurality of mutually equivalent straight-line gratings are formed by holograms as an annular pattern along the outer peripheral edge thereof. A diffracted light beam is produced by applying a light beam in a certain direction to a straight grating. By rotating the hologram disk with the motor, the produced diffracted light beam can be deflected periodically. The diffracted light beam is deflected as the direction of grating lines with respect to the incident light beam is varied upon rotation of the hologram disk. The diffracted light beam is periodically deflected since the incident light beam falls upon different straight-line gratings successively as the hologram disk rotates.

Heretoforee, the straight-line gratings used in the art comprise equidistant-straight-line gratings having a series of fine straight lines that are closely spaced at equal intervals.

For good optical scanning, a diffracted light beam should preferably be deflected by a hologram scanner at a uniform angular velocity (hereinafter referred to simply as a "uniform velocity"). The conventional hologram disks include equidistant-straight-line gratings produced by holograms. This design has failed to deflect the diffracted light beam exactly at a uniform velocity. For example, FIG. 6 of the accompanying drawings illustrates the relationship between angles through which a diffracted light beam is deflected and errors of the uniform velocity at which the diffracted light beam is deflected for scanning, when $\lambda/d = 1.4$ (where $\lambda$ is the wavelength of the incident light beam and d is the spacing between adjacent grating lines) and the angle $\theta i$ of incidence of the incident light beam (the angle between a line normal to the grating surface and the incident light beam) is 44.25°. In the illustrated example, the uniform velocity error when the maximum beam deflecting angle is ±21° reaches +1.16%.

SUMMARY OF THE INVENTION

In view of the aforesaid problem of the prior hologram disks, it is an object of the present invention to provide a hologram disk having an improved equal velocity at which a diffracted light beam is deflected.

Essentially, a hologram disk of the present invention is structurally similar to conventional hologoram disks. The hologram disk is in the form of a circular plate having a plurality of mutually equivalent straight-line gratings formed by holograms as an annular configuration along the outer peripheral edge thereof.

According to the present invention, however, each of the straight-line gratings is not an equidistant-straight-line grating, but includes grating lines spaced at different spacings or intervals. Specifically, the line-to-line spacing or interval $d\theta$ in a position which corresssponds to an angle $\theta R$ through which the straight-line grating (i.e., the hologram disk) has rotated is determined by the following equation:

$$d\theta = \frac{\lambda \sin \theta R}{\sin(\alpha \cdot \theta R)} \quad (1)$$

where $\lambda$ is the wavelength of incident light and $\alpha$ is a constant.

Where the line-to-line interval of the straight-line grating exactly meets the equation (1), the angle $\theta S$ through which the diffracting beam is deflected, i.e, the beam deflecting angle, is expressed by:

$$\theta S = \theta R \quad (2)$$

When the holgoram disk is rotated at a uniform velocity, the diffracted beam is also rotated at a uniform velocity.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 4(I) and 4(II) are plan and side elevational views, respectively, of a hologram scanner employing a hologram disk for deflecting a light beam according to the present invention; and FIGS. 5(I) and 5(II) are plan and side elevational views, respectively, of another hologram scanner employing a hologram disk for delecting a light beam according to the present invention.

DESCRIPTION OF THE PREFERRED EMBODIMENT

Figure 1:
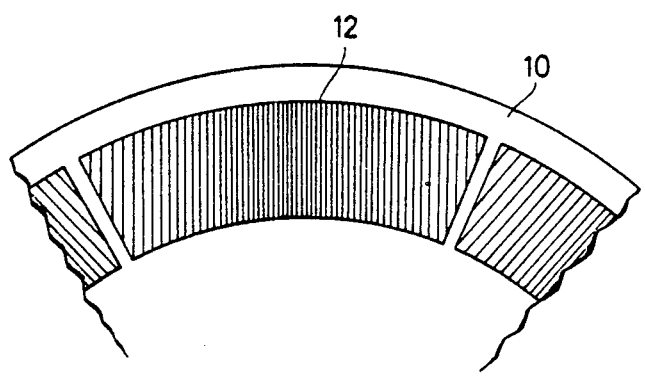
FIG. 1 is a fragmentary plan view of a hologram disk according to the present invention.

As shown in FIG. 1, a hologram disk includes a circular baseboard or substrate 10 and a plurality of mutually equivalent straight-line gratings 12 formed by holograms as an annular pattern along the outer peripheral edge of the baseboard 10.

The angle $\theta R$ through which a straight-line grating 12 has rotated is measured from a straight line (parallel to the lines of the grating) interconnecting the center of the straight-line grating 12 and the center of rotation of the hologram disk. $\theta R = 0$ on the above straight line. By differentiating both sides of the above equation (1) with $\theta R$ and making the result equal to 0, it will be seen that the equation (1) takes a minimum value at $\theta R = 0$, and the minimum value is $\lambda/\alpha$. Therefore, the lines of the straight-line grating 12 are closer in the central area thereof and progressively coarser away therefrom toward the opposite ends, as is evident from FIG. 1.

Figure 2:
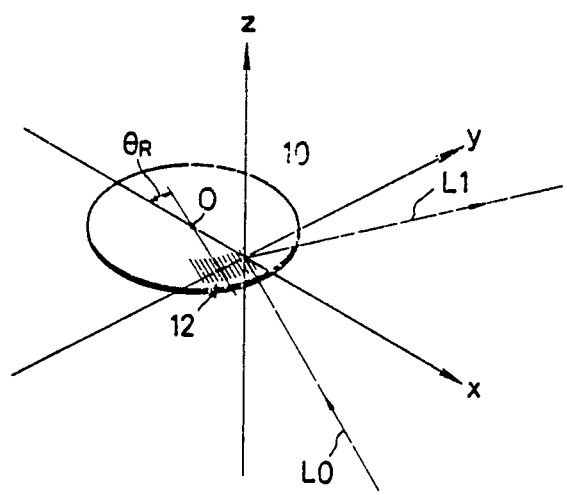
FIG. 2 is a perspective view showing the manner in which the holgoram disk of the invention operates.

Derivation of the equation (1) will be described hereinbelow. As shown in FIG. 2, the hologram disk has a center O of rotation, and an incident light beam L0 is applied to the hologram disk and a diffracted light beam L1 leaves the hologram disk.

A space coordinate system is established with respect to the hologram disk shown in FIG. 2. The coordinate system has its origin located in the position where the light beam L0 is incident on the hologram disk, a z cooridnate axis normal to the baseboard 10 of the hologram disk, an x coordinate axis passing through the origin and the center 0 of rotation of the hologram disk, and a y coordinate axis normal to both the z and x coordinate axes. The angle of rotation of the straight-line grating 12 is expressed as $\theta R$. As described above, this angle $\theta R$ is formed between the x coordinate axis and the straight line passing through the center of the straight-line grating 12 and the center O of rotation of the hologram disk, the angle $\theta R$ being also the angle of rotation of the hologram disk.

Assuming that the direction cosines of the incident light beam L0 are expressed as (lc, mc, nc), the wavelength of the light beam is given as $\lambda$, and the line-to-line distance of the grating at the position where the incident light beam is applied, i.e., at the origin of the coordinate system, is expressed as d, the direction cosines (ld, md, nd) of the diffracted light beam L1 are expressed under diffraction conditions as follows:

$$ld = lc + \frac{\lambda}{d} \sin \theta R \tag{3}$$

$$md = mc + \frac{\lambda}{d} \cos \theta R \tag{4}$$

$$nd = \sqrt{1 - (ld^2 + md^2)} \tag{5}$$

The optical axis of an optical system for processing the light beam that has been diffracted by the straight-line grating is selected to be equal to the direction of diffraction when $\theta R = 0$. Assuming that the direction cosines of the diffracted beam at this time are given as ($l_0$, $m_0$, $n_0$), the angle $\theta s$ through which the diffracted beam L1 is deflected in the main scanning direction and the angle $\theta n$ through which the diffracted beam L1 is displaced in the auxiliary scanning direction are expressed by:

$$\theta s = \tan^{-1}\left( \frac{ld}{mdm_0 + ndn_0} \right) \tag{6}$$

$$\theta n = \cos^{-1}\left( \frac{mdm_0 + ndn_0}{\sqrt{md^2 + nd^2}} \right) \tag{7}$$

The line-to-line distance d is selected to be $d_0$ when $\theta R = 0$ and to be $d\theta$ when $\theta R = \theta$, and the incident light beam L0 is applied in the y - z plane. Now, since $\theta R = 0$ and $lc = 0$ in the equations (3), (4), and (5), the following equations are derived:

$$l_0 = 0 \tag{8}$$

$$m_0 = mc + \frac{\lambda}{d_0} \tag{9}$$

$$n_0 = \sqrt{1 - (l_0^2 + m_0^2)} = 1 - m_0^2 \tag{10}$$

At $\theta R = 0$, we get:

$$ld = \frac{\lambda}{d_0} \sin \theta R \tag{11}$$

$$md = mc + \frac{\lambda}{d\theta} \cos \theta R \tag{12}$$

$$nd = \sqrt{1 - (ld^2 + md^2)} \tag{13}$$

In order for the diffracted light beam L1 to be deflected at a uniform velocity, it is necessary that $\theta s = \alpha \theta R$ where $\alpha$ is a constant.

For liner optical scanning, it is required that the angle $\theta n$ through which the diffracted light beam is displaced in the auxiliary scanning direction be 0. With the left-hand side of the equation (7) being 0, therefore, $$\frac{mdm_0 + ndn_0}{\sqrt{md^2 + nd^2}} = 1 \tag{14}$$

Since $mdm_0 + ndn_0 = \sqrt{md^2 + nd^2}$ from the equation (14), the equation (6) is rewritten using this relationship and the relationship $\theta s = \alpha \theta R$ as follows:

$$\tan(\alpha \cdot \theta R) = \frac{ld}{\sqrt{md^2 + nd^2}}$$

By using $ld^2 + md^2 + nd^2 = 1$, the righthand side of the above equation becomes:

$$\frac{ld}{\sqrt{1 - ld^2}}$$

By substituting the equation (3) (lc=0) for ld in this equation, $$\tan(\alpha \cdot \theta R) = \frac{\left(\frac{\lambda}{\alpha\theta}\right) \sin \theta R}{1 - \left(\frac{\lambda}{d\theta}\right)^2 \sin^2 \theta R} \tag{15}$$

From this equation (15), we get $$\frac{\lambda}{d\theta} = \frac{\sin(\alpha \cdot \theta R)}{\sin \theta R} \tag{16}$$

By solving the equation (16) for $d\theta$, we get $$d\theta = \frac{\lambda \sin \theta R}{\sin(\alpha \cdot \theta R)}$$

which is the equation (1).

Therefore, the diffracted light beam can be deflected at a uniform velocity by the straight-line grating with its line-to-line distance or spacing expressed by $d\theta$ as defined above.

The diffracted light beam can be deflected exactly at a uniform velocity by determining the line-to-line distance of the straight-line grating so as to meet the equation (1). However, the velocity uniformness of deflection of the diffracted light beam is much better than with the conventional equidistant straight-line gratings by selecting the line-to-line distance so as to approximately meet the equation (1).

One specific method of fabricating a straight-line grating with its line-to-line distance meeting the equation (1) will be described with reference to FIG. 3.

Figure 3:
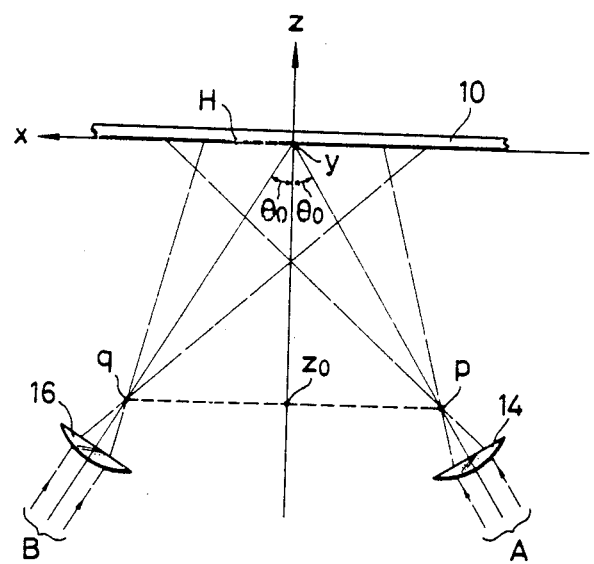
FIG. 3 is a schematic view illustrating how a straight-line grating according to the present invention is fabricated.
Figure 6:
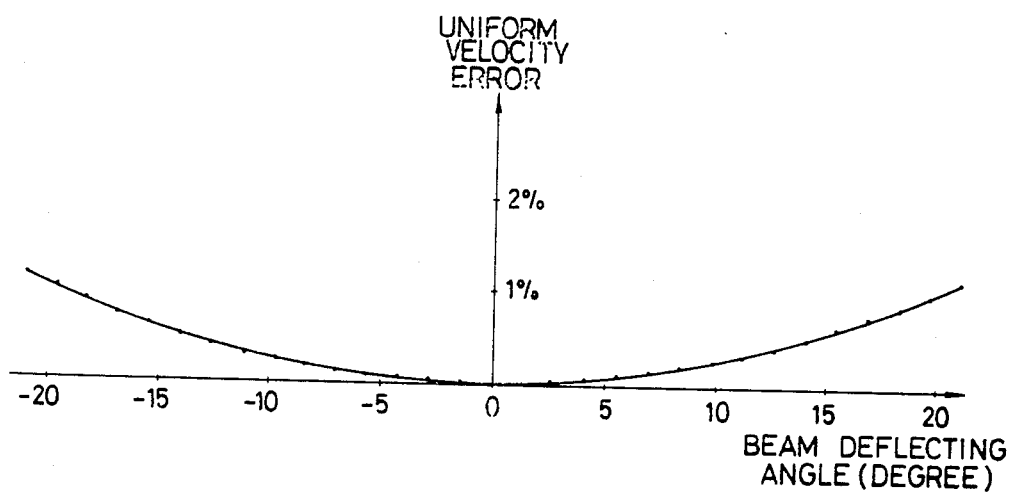
FIG. 6 is a diagram explaining the problem of the conventional hologram disk.

Designated in FIG. 3 at 10 is a disk baseboard, the lower surface of which is coated with a layer of a hologram recording material (such for example as a photoresist, gelatin of dichromic acid, photopolymer, silver salt). Three-dimensional directions, i.e., x-, y-, and z-directions are selected as shown with the y-direction being normal to the sheet of FIG. 3.

Coherent laser beams A, B are incident respectively on cylindrical lenses 14, 16 and converged thereby into linear images parallel to the y-direction at positions p, q, respectively. The coordinates of the positions p, q are given as $p(z_0 \tan \theta_0, z_0)$ and $q(-z_0 \tan \theta_0, z_0)$, respectively, in the x - z plane, where $\theta_0$ is the angle of incidence of the main rays of the beams A, B upon the recording material. The cylindrical lenses 14, 16 have their generators extending parallel to the y-direction.

Wavefronts of light diverging from the positions p, q constitute cylindrical surfaces with their central axes extending through the positions p, q along the y-direction. Therefore, interference fringes produced by these diverging light rays on the x - y plane form a straight-line grating composed of straight lines parallel to the y-direction, and such a straight-line grating is recorded on the recording material.

Assuming that the coordinates of a point H on the recording materail are (xH, 0, 0), the line-to-line distance $d_{xH}$ at this point H is expressed by:

$$d_{xH} = \frac{\lambda_0}{\sin\theta_{01} - \sin\theta_{02}} \quad (17)$$

where $\theta_0$ is the wavelength of the laser beams A, B, and $$\theta_{01} = \tan^{-1}\left(\frac{z_0 \tan \theta_0 - xH}{z_0}\right) \quad (18)$$

$$\theta_{02} = \tan^{-1}\left(\frac{z_0 \tan \theta_0 + xH}{z_0}\right)$$

The wavelength λ of the light to be deflected and the constant $\alpha$ and the above $\theta_0$, $\theta_0$ are in the following relationship:

$$\frac{2\sin \theta_0}{\lambda_0} = \frac{\alpha}{\lambda} \quad (19)$$

Where the wavelength λ of a light beam to be deflected is λ=632.8 nm, $\alpha$=1.6, the maximum beam deflecting angle $\theta_{smax} = \pm 21°$, and the distance between the center of rotation of the hologram disk and the position where an incident light beam is applied to the hologram disk is $\gamma$=50 mm, it is preferable to provide the following hologram recording conditions in the method of FIG. 3: the wavelength of the recording beam $\lambda_0$=441.6 nm (which is equal to the wavelength of a laser beam emitted from an He -Cd laser), the incident angle $\theta_0$=33.94°, and the cylindrical wave diverging point $z_0$=−80 mm. The spatial frequency u of the straight-line grating which is recorded under the above conditions, and the spatial frequency $u_{id}$ of an ideal straight-line grating are given, using the equations (17) and (1), as follows:

$$u = \frac{1}{d_{xH}} = \frac{\sin\theta_{01} - \sin\theta_{02}}{0} \quad (20)$$

$$u_{id} = \frac{1}{d\theta} = \frac{\sin(\alpha \cdot \theta R)}{\sin \theta R} \quad (21)$$

Values of the spatial frequencies u, $u_{id}$ which are calculated for various values of $\theta R$ are given in the following table:

TABLE

| $\theta R$(degree) | u | $u_{id}$ | error (%) |
|---|---|---|---|
| 0 | 2528.643256 | 2528.445006 | 0.008 |
| 1 | 2528.44044 | 2528.244753 | 0.008 |
| 2 | 2527.831563 | 2527.644001 | 0.008 |
| 3 | 2526.815335 | 2526.642775 | 0.007 |
| 4 | 2525.389596 | 2525.241116 | 0.006 |
| 5 | 2523.551312 | 2523.439083 | 0.005 |
| 6 | 2521.296566 | 2521.23675 | 0.002 |
| 7 | 2518.620536 | 2518.634207 | −0.0006 |
| 8 | 2515.517483 | 2515.631562 | −0.005 |
| 9 | 2511.980727 | 2512.228935 | −0.010 |
| 10 | 2508.00262 | 2508.426468 | −0.017 |
| 11 | 2503.57452 | 2504.224312 | −0.026 |
| 12 | 2498.686756 | 2499.622639 | −0.038 |
| 13 | 2493.328593 | 2494.621631 | −0.052 |
| 13.125 | 2492.62517 | 2493.968437 | −0.054 |

As is apparent from this table, the straight-line grating recorded by the above method is substantially identical to the ideal straight-line grating within an error of about 0.05%. By employing such straight-line grating, the velocity uniformness of deflection of the deffracted beam can effectively be improved.

Straight-line gratings with the line-to-line distance determined according to the equation (1) can be recorded on a recording material by an electron beam or mechanical inscription, other than the method shown in FIG. 3.

Figure 4:
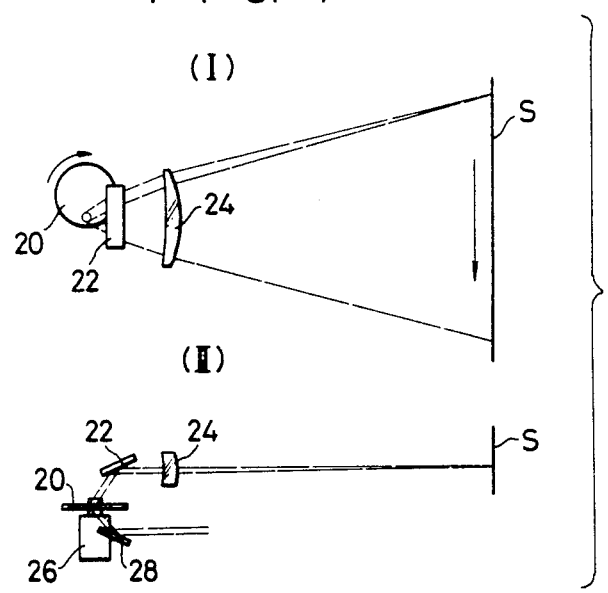
Figure 5:
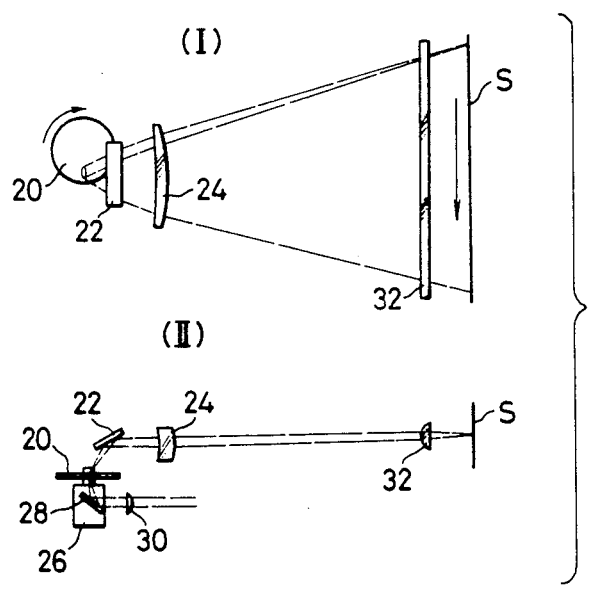

FIGS. 4 and 5 illustrate hologram scanners employing a hologram disk according to the present invention. Denoted in FIGS. 4 and 5 at 20 is a hologram disk for deflecting a light beam, 22, 28 plane mirrors, 24 an fθ lens, 26 a motor, and S a surface to be scanned. Designated in FIG. 5 at 30, 32 are cylindrical lenses.

In the hologram scanner shown in FIGS. 4(I) and 4(II), a collimated laser beam is reflected by the plane mirror 28 to fall on the hologram disk 20, and a diffracted beam is reflected by the plane mirror 22 to pass through the fθ lens 24, which converges the beam as a spot on the surface S. When the hologram disk 20 is rotated by the motor 26 at a uniform velocity, the deflected beam is caused to scan the surface S linearly at a uniform velocity. Since the diffracted beam is deflected at a uniform velocity, the velocity at which the surface S is linearly scanned is uniformized highly accurately by the fθ lens 24.

According to the hologram scanner of FIGS. 5(I) and 5(II), a collimated laser beam is converged by the cylindrical lens 30 in one direction, and then reflected by the plane mirror 28 onto the hologram disk 20. At this time, the incident beam is converged in one direction at a straight-line grating. A divergent diffracted beam from the hologram disk is reflected by the plane mirror 22 to pass through the fθ lens 24 and the cylindrical lens 32, by which the diffracted beam is caused to converge on the surface S. As the hologram disk 20 is rotated by the motor 26, the surface S is linearly scanned at a uniform velocity with high accuracy.

With the hologram scanner of FIG. 5, the grating surface of the hologram disk 20 and the surface S being scanned are held in image-forming conjugate relationship to each other by the fθ lens 24 and the cylindrical lens 32 in the auxiliary scanning direction (which is the vertical direction in FIG. 5(II)). Therefore, the optical scanning is less susceptible to any surface fluctuations of the hologram disk 20 as it rotates, so that the scanning line will not be bent.

Although a certain preferred embodiment has been shown and described, it should be understood that many changes and modifications may be made therein without departing from the scope of the appended claim.

What is claimed is:

1. A hologram disk for deflecting a light beam in a hologram scanner, comprising a plurality of straight-line gratings formed by holograms in an annular pattern for deflecting the light beam, the line-to-line distance $d\theta$ between adjacent lines of each of said straight-line gratings being determined to meet, at least approximately, the following equation when said each straight-line grating is rotated through an angle $\theta R$:

$$d\theta = \frac{\lambda \sin\theta R}{\sin(\alpha \cdot \theta R)}$$

where $\lambda$ is the wavelength of the light beam and $\alpha$ is a proportionality constant, so that the angle $\theta s$ through which the light beam is deflected can be expressed by $\theta s = \alpha \theta R$.

* * * * *